(12) United States Patent
Dejmek et al.

(10) Patent No.: US 8,490,475 B2
(45) Date of Patent: Jul. 23, 2013

(54) MULTI-ZONE FURNACE

(75) Inventors: Michael Dejmek, Birkenau (DE); Luca Mazzoncini, Dossenheim (DE); Alfred Haas, Eppelheim (DE); Markus Friess, Lindenberg (DE); Oliver Koechel, Bubenheim (DE); Georg Vassiliadis, Worms (DE)

(73) Assignee: hte Aktiengesellschaf The High Throughput Experimentation Company, Heidelberg (DE)

( * ) Notice: Subject to any disclaimer, the term of this patent is extended or adjusted under 35 U.S.C. 154(b) by 224 days.

(21) Appl. No.: 12/867,344

(22) PCT Filed: Feb. 13, 2009

(86) PCT No.: PCT/EP2009/001021
§ 371 (c)(1), (2), (4) Date: Dec. 29, 2010

(87) PCT Pub. No.: WO2009/100922
PCT Pub. Date: Aug. 20, 2009

(65) Prior Publication Data
US 2011/0113872 A1    May 19, 2011

(30) Foreign Application Priority Data

Feb. 15, 2008  (DE) .................. 10 2008 009 254

(51) Int. Cl.
*G01M 15/10*  (2006.01)
(52) U.S. Cl.
USPC ........................................ 73/114.75
(58) Field of Classification Search
USPC ........................................ 73/114.75
See application file for complete search history.

(56) References Cited

U.S. PATENT DOCUMENTS

| | | | | |
|---|---|---|---|---|
| 4,717,339 | A | * | 1/1988 | Kersting ...................... 432/125 |
| 5,941,680 | A | * | 8/1999 | Strohmaier ............. 198/750.11 |
| 6,164,961 | A | * | 12/2000 | Luscher et al. ............... 432/121 |
| 6,305,930 | B1 | | 10/2001 | Fedak |
| 6,524,100 | B2 | | 2/2003 | Kurtz et al. |
| 2002/0001787 | A1 | | 1/2002 | Kurtz et al. |

FOREIGN PATENT DOCUMENTS

| | | |
|---|---|---|
| CN | 2798808 Y | 7/2006 |
| DE | 4218705 A1 | 2/1994 |
| DE | 19506503 C1 | 9/1996 |
| DE | 10031071 C2 | 3/2003 |
| EP | 1 297 889 A | 4/2003 |
| JP | 2006 234324 | 9/2006 |
| WO | WO 01/96801 A1 | 12/2001 |

OTHER PUBLICATIONS

International Search Report for PCT/EP2009/0011021 mailed Jun. 17, 2009.
Examination Report of DE 10 2008 009 254.1-24 mailed Nov. 18, 2008.
Office Action for CN 200980105369.6 mailed May 28, 2012.
Office Action for DE 10 2008 009 254.1-24 and English-language Translation mailed Nov. 18, 2008.

* cited by examiner

*Primary Examiner* — Freddie Kirkland, III
(74) *Attorney, Agent, or Firm* — Choate, Hall & Stewart LLP; Andrea L. C. Robidoux; Daniel S. Matthews

(57) ABSTRACT

The present invention relates to a multi-zone furnace for heating and tempering reactors and pipes in devices. The multi-zone furnace according to the invention is modularly constructed, wherein it is e.g. possible to efficiently heat or cool the furnace or also individual zones of the furnace. Furthermore, exchangeable cassettes provide the advantage that the reactors and the components, which are connected to the reactors, are particularly well accessible, wherein reconverting work is facilitated.

13 Claims, 8 Drawing Sheets a)

b)

MULTI-ZONE FURNACE

CROSS-REFERENCE TO RELATED APPLICATIONS

This application is a National Phase application under 35 U.S.C. 371 of International Application No. PCT/EP2009/001021, filed Feb. 13, 2009 and published as WO 2009/100922 on Aug. 20, 2009, which claims priority to German patent application serial number DE 102008009254.1, filed Feb. 15, 2008, the entirety of each of which is hereby incorporated herein by reference.

The present invention relates to a multi-zone furnace for heating and tempering reactors including the inlet pipes and outlet pipes thereof. Preferably, said furnaces are employed in devices for the testing of catalysts in laboratory operation. The multi-zone furnace forms a thermally insulating housing, which is provided with feed-throughs, wherein the feed-throughs allow for a thermally isolated connection between individual zones of the furnace, or between the outside section and the interior zone of the furnace, respectively.

Thereby, the present invention particularly relates to a multi-zone furnace suitable for all types of devices, in particular for catalytic devices, comprising a frame structure (14), which is provided with insulating plates (17, 17' . . . ). Thereby, the frame structure defines at least one chamber (01), which comprises two or more zones (10, 20 . . . ) having different temperature, which are separated from each other by means of at least one insertion element (15).

In principle, laboratory furnaces are known from the state of the art wherein, however, most laboratory furnaces have only a single heating chamber. This single heating chamber cannot be divided in different furnace regions, respectively furnace zones, and accordingly cannot be heated to locally different set temperatures. Traditionally, laboratory furnaces are suitable for drying or for the dry storage of articles.

The muffle furnace as disclosed in DE 42 12 233 has to be mentioned as an example for a furnace comprising a single chamber.

EP 878 680 A1 discloses a furnace for the drying of lacquered samples, which can be blown with warm air both from the upper side and from the bottom side in a support device, which is within the furnace, wherein the air flows, which are guided to the upper side and the bottom side, can be heated by means of separate tempering devices.

One of the objects of the present invention consists therein in providing a furnace, which allows for keeping a device on different temperatures at different positions within said furnace. Thereby, the furnace is to be operated as simple as possible and should allow for an access to the parts of the device as simple as possible, which are present within the furnace. Also, during operation, temperature changes in different zones of the furnace should be possible and/or it should be possible to change the arrangement of the zones.

These and other objects are solved thereby that a multi-zone furnace (1) for heating and tempering of reactors, containers and pipes is provided, which comprises at least one frame structure (14), which is provided with at least one insulating plate (17, 17' . . . ), wherein said furnace comprises at least one chamber (01) comprising two or more zones (10, 20 . . . ).

Thereby, preferably two zones have different temperatures, respectively. The average temperature difference between two zones (also: temperature zones) thereby is at least 10 K, preferably at least 50 K, more preferred at least 100 K.

A temperature difference between different zones is preferably achieved by means of separated and separately controllable means for heating/cooling and—further preferred—by employing cassettes for heating and/or cooling.

The term "chamber" in the meaning of the present invention describes each region of the furnace, which is framed in all three space directions by means of a frame structure and, preferred, comprises a front door (per chamber), which preferably is mounted on at least one frame strut member. The frame structure is preferably generated by means of the connection of single frame strut members.

Frame strut members are frames preferably made from metal, fiber materials (graphite fibers) and/or composite materials. Metal frames are preferably made from steel or aluminium, or respective alloys. It is further preferred that frames are employed having profile. In a preferred embodiment, the frame structure of the furnace is made from a steel frame, which is surrounded by insulating material.

Preferably, as frame strut members, standard frames are selected, which can be connected by means of the known joining technology. Thus, due to the operation temperature, the frame is preferably constructed from steel profiles, which are short-termedly and cost-effectively available. Preferably, a weldable steel is selected. Alternatively, tailored profiles may also be screwed or riveted. For saving weight and material costs, steel profiles are to be preferred. Compared to flat steel, steel profiles have an increased rigidity and are produced as bulk commodity. Preferably, angle profiles of each type (L, T, double-T) but also box sections are used. Thereby, if necessary, add-on parts to be fixed such as flanges, mounting links, hinges, junction plates, eyes and the like play a role for the specific selection of a profile.

Subsequent to the manufacture of the metal frame, said frame is protected preferably by means of a paint against corrosive and other attacks. Alternatively, the frame can be covered by means of a powdered protection layer or other protection layers.

In a preferred embodiment of the present invention, at least two of the all in all at least two zones (10, 20 . . . ) of a chamber (01) are separated from each other by at least one insertion element (15).

In a preferred embodiment, at least one insertion element comprises, respectively all insertion elements comprise bar guides such that the insertion elements can be pulled out from the furnace in the manner of a drawer.

In a further preferred embodiment, means are present in order to change the position of the insertion elements—while these are present within the furnace—by means of a rotary motion. Hereby, preferably, the upper surface of an insertion element is rotated into the direction of the front side of the furnace. This preferred arrangement according to which an insertion element is rotatable from an horizontal position into a tilted position causes the advantage that, for example, plug-in reactors which, under the circumstances, have a significantly elongated extension, and which are positioned in the rear region of the furnace zone, can be better assembled and removed (see FIG. 5).

Preferably, an insertion element (15) is provided with one or more feed-through(s) (43).

In the meaning of the present invention, feed-throughs should provide the transition of components and thereby, in particular, should provide the transition of pipes of all types from one zone to another zone. Said pipes may be inlet pipes and outlet pipes for fluids, but may also be electric lines. The feed-throughs are preferably realized such that in fact the component/pipe may be guided through the feed-through, however, that simultaneously a maximal thermal insulation between the two adjoining zones is ensured (see FIG. 8).

In particular for the preferred use of the multi-zone furnaces according to the invention, it is often required for catalysis testing facilities that numerous supply pipes lead into the furnace through feed-throughs, and also lead out from the furnace. Furthermore, also a communication between the individual chambers is required, which is effected by means of the feed-throughs. The feed-throughs according to a preferred embodiment are thus flexibly realized such that it is possible to reconvert the devices, which are in the furnaces without requiring constructive changes at the furnaces.

Thus, it is preferred that a furnace according to the invention is generally provided with a certain number of feed-throughs, which may be temporarily activated. In a preferred embodiment, the feed-throughs comprise a thermally stable material, wherein it is further preferred to plunge the pipes and further supply pipes through the feed-throughs without requiring constructive changes at the furnace.

An alternative possibility for creating temperature zones consists therein in fixing several furnace boxes, which are a little bit smaller, within a larger, self-supporting housing, i.e., the chamber, wherein the regions between the furnace boxes thereby are preferably realized such that said regions are not thermally conducting or are only badly thermally conducting. Preferably, this can be achieved by foaming with heat-resistant foams or by coating with other thermal insulating materials.

In a preferred embodiment, then each of the smaller furnace boxes is provided at the rear panel with heating cassettes. The term "insertion element" would in this specific case relate to the connection of a cover plate, respectively bottom plate of two furnace boxes, which are thermally decoupled by means of an insulating layer from each other. Besides a self-supporting housing, however, a frame construction may be used in this case.

The arrangement of small furnace boxes in a self-supporting housing for the development of the temperature zones is in particular advantageous for higher piece numbers. Compared to this, the use of simple insertion elements is particularly advantageous for such multi-zone furnaces, which have to be more frequently reconverted.

Further preferred, each individual zone (10, 20 . . . ) is in operative connection with at least one heating cassette (12, 12' . . . ). Hereby, it is preferred that the heating cassettes (12, 12' . . . ) are detachably connected to the multi-zone furnace, from the outside, and, in particular, can also be removed from the furnace during the operation, respectively can be changed without further restriction of the function of the furnace. A heating cassette allows the controlled tempering of a zone. A flap at the rear side or at one of the two sides of the multi-zone furnace, which can be closed, respectively opened for the heating/cooling, may also be regarded as "heating cassette" in the meaning of the present invention.

In a further preferred embodiment of the furnace according to the invention, at least one heating cassette (12, 12' . . . ) can be replaced by at least one cooling cassette.

In a further preferred embodiment, the multi-zone furnace according to the invention is modularly realized. Thereby, "modular" means that individual parts of the furnace can be removed from said furnace, or can be added without affecting the furnace in its overall function.

Figure 1:
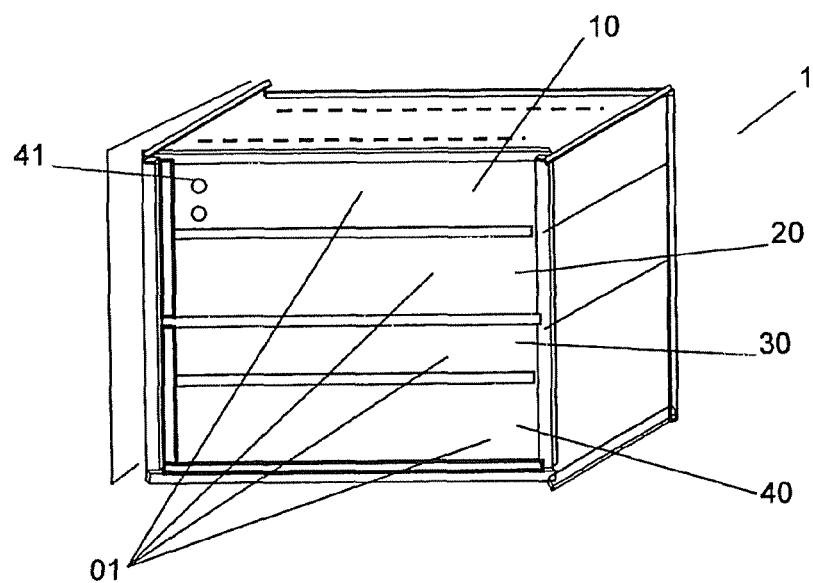
FIG. 1a) shows a schematic realization of a multi-zone furnace according to the invention, which has a single heating chamber, which is segmented by means of insertion elements into four different (horizontal) temperature zones.
FIG. 1b) shows a schematic view of a multi-zone furnace according to the invention, which comprises three different (vertically arranged) heating chambers, wherein two of the heating chambers are provided with three different temperature zones, respectively, and the third heating chamber is provided with two temperature zones.
Figure 1:
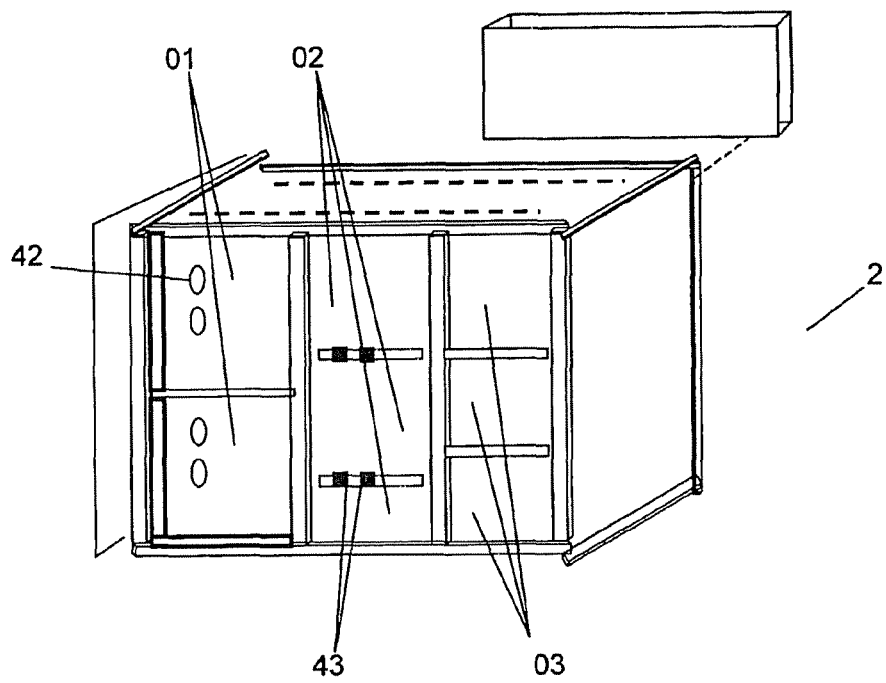

With regard to the preferred dimensions of a multi-zone furnace according to the invention, it has to be mentioned that the breadth and the height of the furnace preferably is in a range of from 1 to 2 m, respectively, and that the furnace further preferably has a depth, which is in the range of from 0.5 to 1 m.

The multi-zone furnace according to the invention is characterized by a high mechanical stability. The high mechanical stability is preferably effected by the modular frame realization and by the arrangement of the chamber in zones comprising insertion elements, respectively (see for example FIG. 3).

In a preferred embodiment, it is possible to fix in the interior zone of the furnace components, the weight thereof is more than 50 kg, preferably more than 100 kg.

The specific mechanical stability of the whole furnace and also the stability of the components of the multi-zone furnace effect the components to only unessentially warp or deform under extreme operating conditions, in particular under high temperatures, so that the multi-zone furnace according to the invention is significantly superior to a known laboratory furnace with regard to its frame structure.

The insulation plates (16, 17, 18), which preferably are connected at the outer faces of the multi-zone furnace according to the invention to the frame structure, are preferably made from a hard fiber material, which further preferably is grouted or glued.

As materials for the manufacture of the insulating plate (16, 17, 18) and also of the insertion elements (15), in particular materials are suitable, which are grouted to laminates, which comprise a mica fraction in connection with silicon resin impregnation. Furthermore, silicate materials, which are reinforced with inorganic fibers, are suitable as well as special ceramics, which may be employed under high thermal constant load (such insulation plates may be purchased for example under the names GL-M and GL-P from company Brandenburger Isoliertechnik, wherein the temperature resistance of these plates is, for example, in the range of from 400° C. to 500° C., the compression strength is in the range of from 300 to 400 N/mm$^2$, and the coefficient of thermal conductivity is in the range of from 0.1 to 0.3 W/mK).

The insulating plates are massive and provide the advantage that feed-throughs may be applied in the plates by means of drilling or sawing. This hard fiber material is significantly superior to an insulating material made from glass wool or insulating fabrics, wherein in particular a significantly higher flexibility with regard to the working is given, which particularly provides an advantage in customization of furnaces for catalytic devices, since the number and the dimensioning of the feed-throughs often very strongly differ from device to device.

In a preferred embodiment of the multi-zone furnace according to the invention, the insulating plates (16, 17, 18) have a wall thickness, which is in a range of from 1 to 10 cm, wherein a range of from 2 to 8 cm is preferred, and a range of from 4 to 6 cm is particularly preferred.

An insulating plate also comprises laminar thermal resistances such as plates, which are arranged in a stack-like manner, plates having honeycomb structure, wherein the insulating effect also may be achieved by foaming the clearances. Likewise, it is possible to realize the insertion elements from different materials, and to connect said materials to the insulating materials in a suitable manner.

The insulating plates as preferably employed in the manufacture of the side walls (17, 18), and the plates, which are employed for the manufacture of the insertion elements (15), may consist from the same or from different materials. The respective insertion elements can differ from each other in a manner such that said elements either simultaneously have the function as a supporting element and as insulating element, or only as supporting element, respectively only as insulating element.

In a preferred embodiment of the multi-zone furnace, each individual side wall is provided with an individual insulating plate. In another embodiment, the individual side walls of the multi-zone furnace are provided with several smaller insulating plates, which are arranged in a tile-like manner (see FIG. 3). The use of several smaller insulating plates may be advantageous for the conversion of the furnace.

The feed-throughs (41, 42, 43) within the insulating plates (16, 17, 18) and within the insertion elements (15) preferably serve for the receiving of pipes, valves, thermal elements and further technical means, which are required in connection with the device, which is within the furnace. A particular technical advantage for the feed-throughs according to the invention consists therein that these in fact provide a communication, respectively an operative connection between the individual zones and chambers, or between the outside section and the interior section, however, thereby the effect of the connection as a thermal bridge is as low as possible. This is of great importance particularly for the operative connections between the individual zones within the internal space, and represents a significant improvement compared to a mere aggregation of several conventional laboratory furnaces.

Since the device according to the invention is modularly realized, it has the advantage that it may be particularly simple and time-saving converted, for example in order to be employed as a differently constructed device, or in order to be used under different operating conditions.

It is a preferred aspect of the multi-zone furnace according to the invention that the individual furnace zones, respectively the individual chambers may be heated and/or cooled to different temperatures by means of the heating cassettes.

Thereby, the individual zones and/or chambers, which have an own heating cassette, are preferably also provided with individual means for the temperature regulation, respectively for the temperature control. Preferably, each heating cassette is provided with a temperature controller, respectively, wherein further preferably at least two temperature sensors are attached within the respective temperature zone.

Preferably, the temperature controller are PID-controllers, which typically are integrated in an external control box, wherein a thermal decoupling from the hot furnace regions is ensured.

In a preferred embodiment of the multi-zone furnace according to the invention, the temperature control within the individual furnace zones is effected by means of one (or several) PID-controllers (e.g. Eurotherm), respectively. At least one temperature controller per heating cassette is preferred. The measured data may be saved preferably simultaneously via a data processing equipment.

A heating cassette is preferably connected from the outer face to one or to several zones in a detachable manner. In a further preferred embodiment, the heating cassettes form the part of a furnace door, respectively a furnace flap. By means of the easy manageability, an exchange of heating cassettes is particularly advantageous.

Heating cassettes are preferably exchanged, respectively inserted or removed via doors or flaps at the rear panel of the furnace. This has the advantage that the internal space of the furnace is accessible also from the rear side, which significantly facilitates maintenance operations and the routine exchange of reactor pipes.

The heating cassettes preferably comprise at least one recirculating blower, which further preferably has the form of a propeller, and which sucks the air from the internal space of the furnace. The air, which is sucked by the recirculating blower is catapulted preferably against a heating element, is heated and is fed via a deflector plate or a guide plate to the internal space of a heating zone. It has to be outlined as an advantage of the construction that the fluid dynamics of the hot air flowing from the heating cassettes within the respective furnace zone may be predetermined by means of so-termed guide plates or guide bodies within the furnace without the need to convert the furnace itself.

Guide plates are preferably perforated plates, rib plates or honeycomb bodies. By means of suitable guide plates, the hot air may be fed from different positions into the furnace, for example from the lateral region. Furthermore, a non-symmetric distribution of the hot air is possible within the furnace, which results in a defined temperature gradient. However, all in all, a symmetrical heat distribution within one zone is preferred.

The individual heating cassettes (12, 12', . . . ) of a multi-zone furnace can differ from each other with respect to both the dimensioning and the performance characteristics, whereby it is also possible that a larger heating cassette is in connection with more than one individual heating zone.

Thereby, an individual heating cassette can be provided with more than one recirculating heating blower.

In another preferred embodiment of the multi-zone furnace, the heating cassettes may be partially used for the cooling such that the parts of the device, which are assembled within the individual zones or chambers, may particularly fastly and independently from each other be set to a lower temperature range. Thereby, for example, also the cooling of a bundle reactor to room temperature may be effected in a particularly time-saving manner, if said reactor has been run at a high temperature within the reaction zone, wherein in turn the throughput is increased.

A further advantage of the multi-zone furnace according to the invention consists therein that it is possible to cool down to room temperature a particular temperature zone, respectively furnace chamber, whereas the adjacent temperature zones, respectively furnace chambers may be tempered to a high operating temperature. Hereby, those components of the device—such as valves, multiport valves of hot gas analysers—may particularly well be protected against abrasion, which otherwise would be sensitive for defects against temperature changes and temperature variations.

In a preferred embodiment of the multi-zone furnace according to the invention, the heating zones are tempered within a range of from room temperature up to 300° C. It is also conceivable to heat the zones to temperatures, which are above 250° C., wherein in such embodiments the driving motor for the fan of the recirculating blower is to be mounted outside of the furnace zone, since the heat resistance of the driving motor is limited.

If individual furnace zones, respectively all furnace zones are to be realized for the operation at high temperatures, that is above approximately 500° C., then the heating cassettes preferably comprise radiant heaters, which preferably may also be combined with cooling function.

Since the heat transport via radiation is relevant only up from 600° C., it is preferred for temperatures up to approximately 500° C. to operate the heating cassette in the mode of a circulating air heating, i.e., the heating cassette then preferably comprises a circulating air heating element.

In a preferred embodiment, the heating cassettes may be exchanged by cooling cassettes in a simple manner. The realization of the dimensions of the components and of the closure elements facilitate said simple exchange. The cooling cassettes preferably comprise a heat exchanger with or without fan and preferably an external fluid circulation. Individual regions of the device may be particularly fastly and effectively cooled down by means of the cooling cassettes. Thereby, the use of cooling fluids is preferred, which may be employed in a temperature range of from 10° C. to 300° C. Thereby, the cooling preferably is performed by means of nitrogen or air cooling or evaporation cooling or by means of heat exchange via cooling circuits.

It is also possible to integrate heating cassette and cooling cassette within a single component.

In a further and preferred embodiment, at least one of the chambers comprising the heating/cooling cassettes (respectively tempering cassettes) is cooled to temperatures, which are below room temperature. Then, this may be particularly advantageous if liquid reaction products are collected in a separator system within a furnace chamber of the catalytic device, which is downstream of the furnace chamber comprising the reactor unit. By means of the cooling of the at least one chamber and the products within the chamber, it is possible to temper the separation and the products to a constant temperature, and thus to ensure reproducible parameters with regard to the phase equilibriums within the separator.

The heating/cooling cassettes (tempering cassettes) preferably are electrical heating coils or cooling coils, which are flown through with a liquid.

The multi-zone furnaces according to the invention are preferably used for the housing of catalysis testing facilities, wherein it is further preferred that the facilities are catalysis testing facilities comprising reactors which are arranged in parallel.

Preferably, the cooling chambers/cooling cassettes are operated at temperatures from 0° C. to 15° C., wherein a range of from 5° C. to 10° C. is further preferred. Since, if the case may be, water is deposited from the air on cooled components, it is preferred that the cooling chambers are provided with collectors for condensed water. In presence of collectors for condensed water, the cooled chambers are preferably operated in a temperature range up to −30° C.

Examples for the use of multi-zone furnaces in catalytic devices are methods in which liquids are to be vaporized, which in turn are fed in vaporized condition via a heated pipe system into individual reactors, whereby the tempering of the inlet pipes and outlet pipes differs, and in particular also the reactors are to be kept on a different temperature.

Furthermore, methods are realizable in which receiver vessels comprising liquid substances and evaporators are stored in the individual zones, wherein then also often heatable product storage vessels are arranged within the pipe system, which is on the outlet side of the reactor. The condensation of fluids in pipes, which serve as inlet pipes or as outlet pipes, may be effectively prevented in a multi-zone recirculating air furnace.

It is conceivable to employ the multi-zone recirculating air furnace also for general laboratory respectively semi-pilot plant investigations, which are beyond the field of the testing of catalysts. Exemplarily mentioned is the parallelized realization of corrosion tests and aging investigations by means of which it is possible to reproduce the resistance of process devices in an economically beneficial manner.

In a preferred embodiment, the multiple zone furnaces are not sealed in a gas tight manner against the environment. This is advantageous since the reactors, which are within the furnaces, may have leakages, whereby toxic or easily flammable gaseous substances may at first penetrate into the internal space of the furnaces. Since the present furnaces preferably are not sealed in a gas tight manner, the toxic or easily flammable gases diffuse to the outside where an exhauster is arranged in order to remove the toxic or easily flammable gases. These gases may be for example carbon monoxide, hydrogen, sulphur dioxide and nitrogen oxides.

In the following, preferred embodiments of the present invention are described more closely.

In a preferred embodiment of the multi-zone furnace (1) according to the invention, which is presented in FIG. 1a), said furnace comprises several different temperature zones (10, 20, 30 and 40), which are closed with a single front flap, and which all in all form a (furnace) chamber (01). This chamber is defined by means of the external frame construction, which is graphically indicated in the figure.

The temperature zones are separated from each other by means of insertion elements, wherein the zones differ from each other in the height such that, for example, the height of the zone (30) is lower than the height of the zone (40). Within the insulating plate, which is directed to the front, are exemplarily two feed-throughs (41).

In a further preferred embodiment, which is presented in FIG. 1b), the furnace (2) is provided with more than one chamber, i.e., the frame construction forms several chambers. Exemplarily, in FIG. 1b) three different furnace chambers (01, 02 and 03) are to be found. Each furnace chamber may have a different number of temperature zones, which differ from each other with respect to size and design, respectively. Typically, each individual chamber is accessible by means of a separate furnace door. It is also conceivable to wave the fixing of a door at said parts of the furnace, which are used for the closure of a maintenance-free temperature zone. Instead of a furnace door, for example, an insulating plate might be screwed to the respective region of the front wall.

Furthermore, in FIG. 1b), feed-throughs (42) are shown in the insulating plate, which is directed to the outside, as well as feed-throughs (43) in the insertion elements, which are in the interior of the furnace. Likewise, a heating cassette is indicated, which has to be mounted at the rear side.

Figure 2:
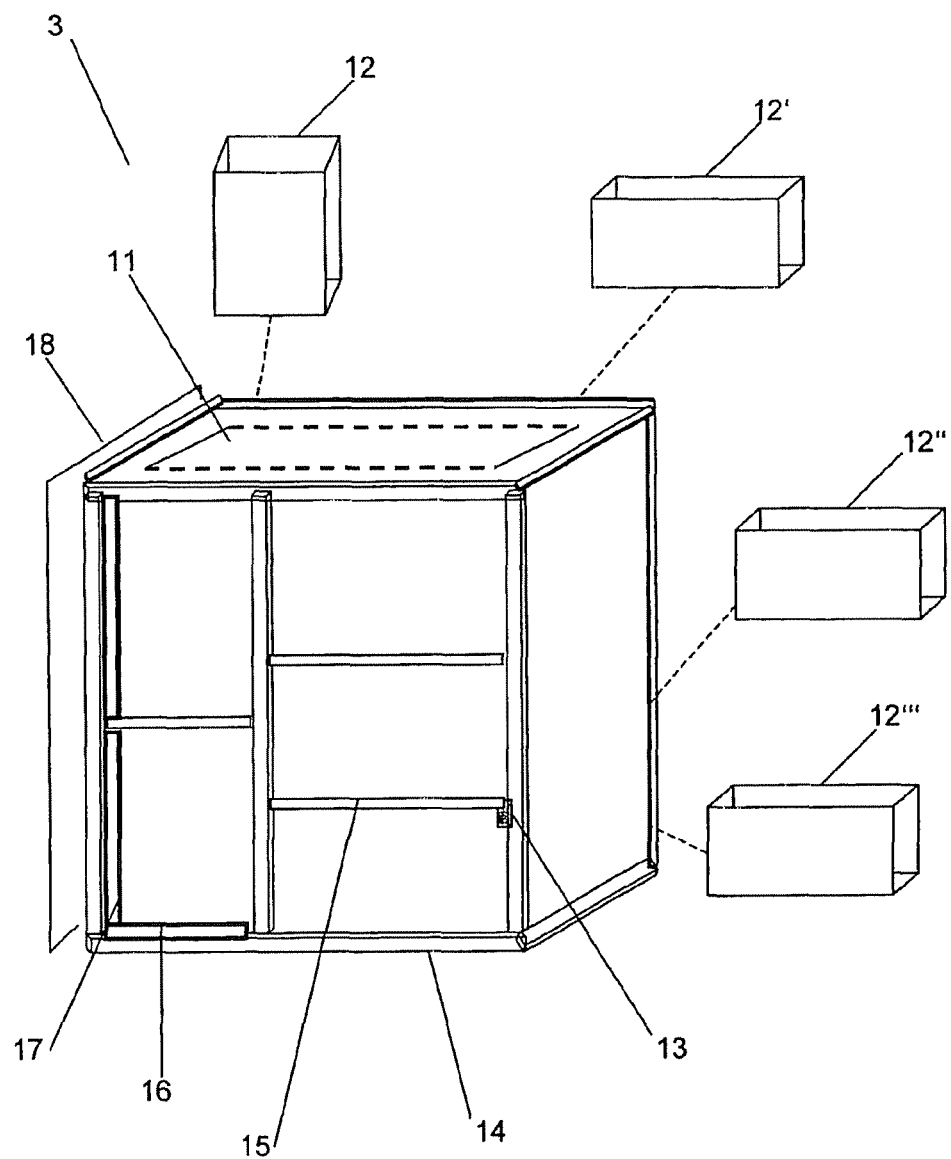
FIG. 2 shows a schematic realization of the multi-zone furnace according to the invention, which is provided with two chambers and comprises a total of five heating zones.

In FIG. 2, a preferred embodiment of the furnace (3) according to the invention is presented, which comprises two chambers [defined by means of the frame structure (14)] and a total of five temperature zones, wherein the left chamber of the surface has two and the right chamber has three heating zones, each defined by means of the insertion elements (15) [which in turn are mounted on the supporting means (13)]. Both the right and the left chamber of the furnace are locked with own furnace doors, which are not presented in the figure.

With respect to four of the five temperature zones, corresponding heating cassettes (12, 12', 12'', 12''') are shown, which are detachably mounted from the outside at the rear wall. At the upper side of the furnace, a flap (11) may be present by means of which the accessibility of the upper heating zones from the outside of the furnace is improved. On the left side aside of the furnace, a plate is present as side wall (18), which serves for the casing of the frame structure and of the outside section of the furnace. Correspondingly, also a bottom insulating plate (16) and a front insulating plate (17) are shown.

Figure 3:
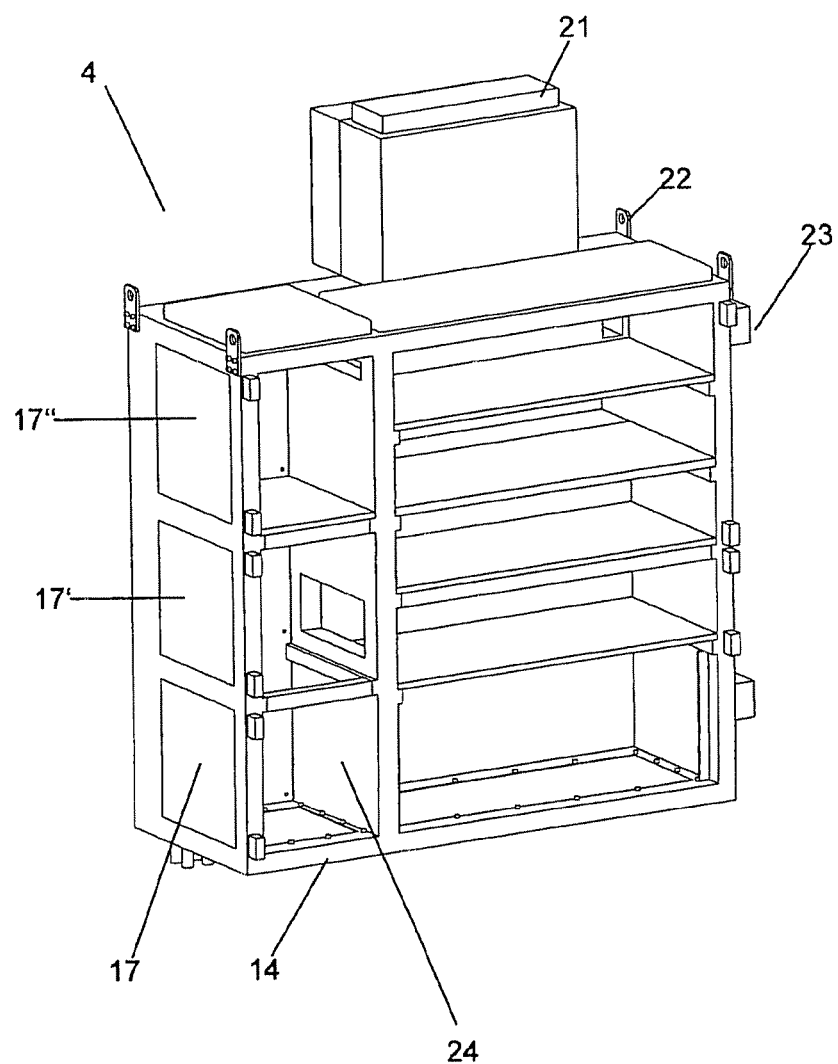
FIG. 3 shows a view of a further embodiment of the multi-zone furnace according to the invention, which comprises two heating chambers having a total of eight heating zones.

In a preferred embodiment, which exemplarily is presented in FIG. 3, the multi-zone recirculating air furnace according to the invention is connected to a small additional furnace (21), which is at the upper side of the main furnace (4) in said presentation. The frame structure defines three smaller chambers (left) and a main chamber (right).

The additional furnace shown in FIG. 3 is important for the realization of more complex catalysis testing facilities if, for example, certain fluids to be tempered are to be fed from the upper side into the multi-zone furnace. The insulating plates (17, 17', ...), which are laterally attached, are smaller insulating plates, which are separately provided. By means of the use of said separate insulating plates, the furnace may be easily converted if, for example, other components (such as mounting parts, valves or pipes) are to be guided through the plates. The mounting means (23) are used for the transportation of the furnace and for the mounting of the furnace within the facility.

Figure 4:
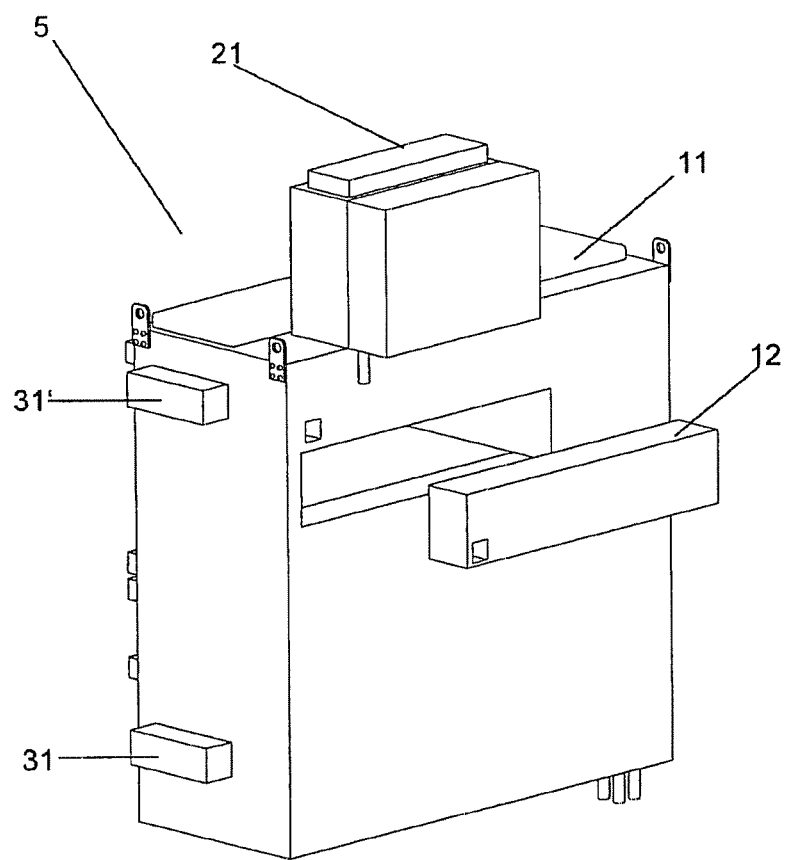
FIG. 4 shows a view of the multi-zone furnace according to FIG. 3 in a lateral view onto the rear panel, wherein at this place an upper heating cassette (12) is detached from the furnace.

In FIG. 4, the same furnace as in FIG. 3 is shown from an alternative perspective, in fact from the rear side. The laterally fixed elements (31, 31') are ventilation flaps, which serve for the cooling of the furnace, respectively of the furnace flap, which is in connection with the ventilation flap. Thereby, the lateral ventilation flaps function as passive elements for cooling. By using cooling cassettes, which are exchanged against heating cassettes (12) at the rear side of the furnace, a cooling with higher efficiency is possible. It is thereby possible to wave the fixing of lateral ventilation flaps, if the furnace zone may be cooled down faster and more efficient by means of a cooling cassette.

Figure 5:
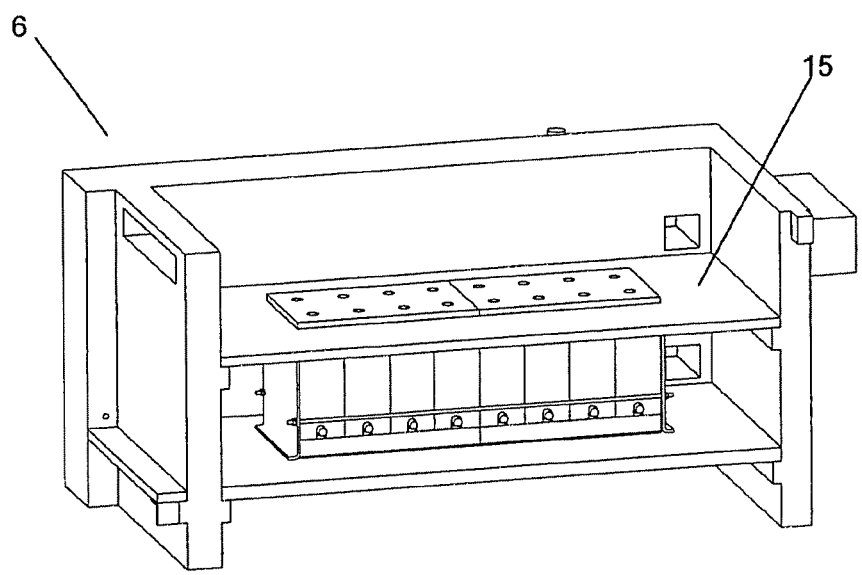
FIG. 5 shows a cut of an interior zone of a multi-zone furnace, which is provided with different bottom plates in which a reactor block is embedded.
Figure 6:
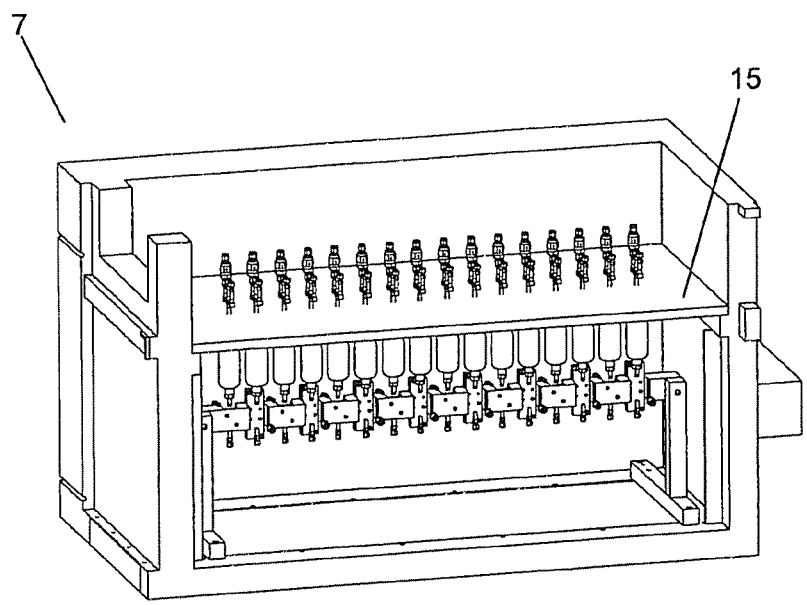
FIG. 6 shows a part of the interior zone of a multi-zone furnace, which is provided with a bottom plate in which sixteen circular feed-throughs and storage vessels are embedded.

FIG. 5 and FIG. 6 exemplarily show how different insertion elements (15) may be realized within the furnace, whereby the lower insertion element in FIG. 5 supports a metal body comprising plug-in reactors, the weight of which is more than 100 kg. In FIG. 5, it may also be recognized that in one embodiment it may be advantageous, if the upper side of an insertion element (respectively also both insertion elements) may be shifted to the front, or may be pulled out from the furnace in the manner of a drawer in order to replace plug-in reactors, which otherwise are only difficultly to handle in the rear part of the temperature zone. By means of the flexibility of the insertion element, respectively the insertion elements in connection with the reactors, the device may in total be realized in a more compact form.

FIG. 6 presents an insertion element (15), which has sixteen circular feed-throughs through which the respective separated pipes for separating fluids lead.

Figure 7:
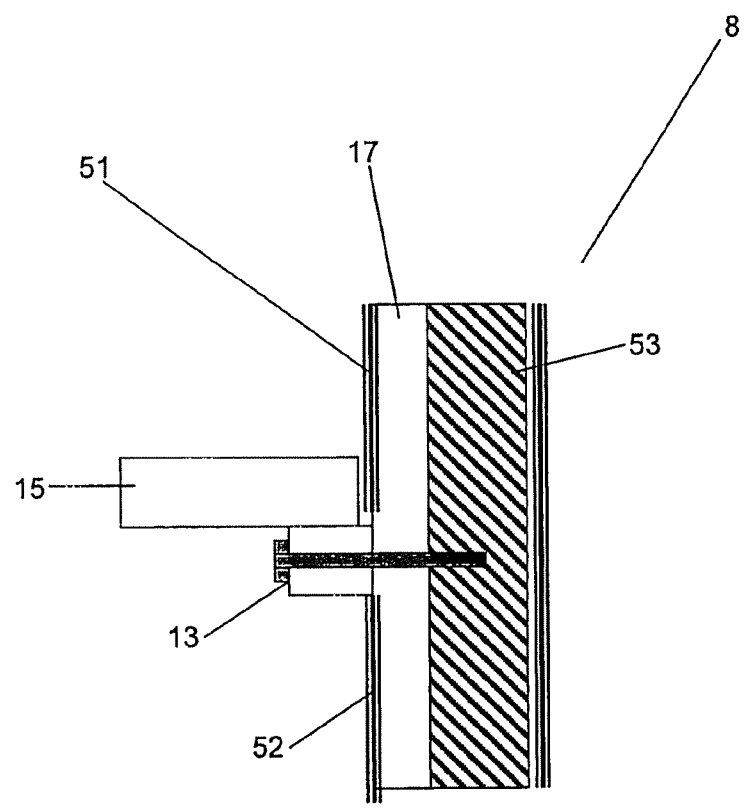
FIG. 7 shows a schematic view of the fixing of the insertion element, which separates an upper furnace zone from a lower furnace zone, wherein the plate of the upper zone is separated from the plate of the lower zone.

FIG. 7 shows a schematic presentation of the mounting of the insertion element (15) in the furnace chamber, wherein the plate of the upper zone (51) is separated from the plate of the lower zone (52). By means of the separation of said metallic components, the thermal communication between the different temperature zones of the furnace is largely prevented, wherein this particularly is of great importance if great temperature differences between the individual zones and chambers are to be achieved.

Figure 8:
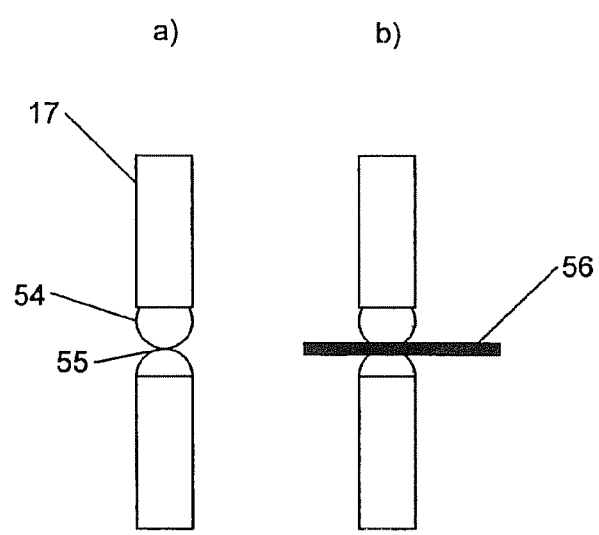
FIG. 8a) shows a flexible feed-through in the wall of an insulating plate, which is covered from the upper side and from the bottom side with a thermoplastic insulating material.
FIG. 8b) shows a flexible feed-through into which a connection pipe has been inserted.

The feed-throughs (41, 42) are both usable for the variable realization of components and for the realization of permanently installed components. In FIGS. 8a) and 8b), a coating of a feed-through comprising a thermoplastic sealing material is shown, which may be fixed within several ranges of the feed-through. In FIGS. 8a) and 8b), the thermoplastic material was fixed at the upper side (54) and at the bottom side (55) of the insulating plate (17), wherein in FIG. 8b) a pipe is presented, which is fixed in the feed-through, and which connects two different furnace regions to each other.

LIST OF REFERENCE NUMERALS 1, 2, ..., 8 multi-zone furnace
11 flexible cover plate
01, 02 ... (furnace) chambers
10, 20 ... (temperature) zone
12, 12', ... heating cassette
13 mounting means for insertion element
14 frame structure
15 insertion element
16 bottom insulating plate
17, 17' ... wall insulating plate
18 side wall-housing
21 additional furnace
22 mounting means for multi-zone furnace
23 mounting means
24 connecting wall
31, 31' ventilation flaps
41, 42 feed-throughs
43 feed-through within an insertion element
51 plate from the upper zone
52 plate from the lower zone
53 cut-out of insulating plate (17)
54, 55 thermoplastic insulting material
56 pipe

The invention claimed is:
1. A multi-zone furnace for catalytic devices, comprising a frame structure (14) comprising insulating plates (17, 17' ... ), wherein the frame structure defines at least one chamber (01), which comprises two or more different temperature zones (10, 20 ... ), which are separated from each other by means of at least one insertion element (15), wherein at least one insertion element comprises at least one feed-through, wherein the at least one feed-through allows for a thermally insulated connection between individual zones of the furnace or between the outside section and the interior zone of the furnace, respectively.

2. The multi-zone furnace according to claim 1, characterized in that two or more zones (10, 20 . . . ) are in operative connection with at least one heating cassette (12, 12' . . . ), respectively.

3. The multi-zone furnace according to claim 1, characterized in that the heating cassettes (12, 12' . . . ) are detachably connected, from the outside, to the multi-zone furnace.

4. The multi-zone furnace according to claim 1, characterized in that the heating cassettes (12, 12' . . . ) comprise a heating device and/or a cooling device.

5. The multi-zone furnace according to claim 1, characterized in that the heating cassettes (12, 12', . . . ) are realized such that they present a part of a flap, respectively door, or are themselves a flap or a door.

6. The multi-zone furnace according to claim 1, characterized in that at least one insertion element is flexibly fixed by means of bar guides at the side walls of the furnace chamber.

7. The multi-zone furnace according to claim 1, characterized in that the wall thickness of the insulating plates (17, 17' . . . ) is in a range of from 1 to 10 cm.

8. The multi-zone furnace according to claim 1, characterized in that at least two heating cassettes (12, 12' . . . ) differ from each other with respect to dimensioning and the performance characteristics.

9. The multi-zone furnace according to claim 1, characterized in that at least one individual heating cassette (12) is in operative connection with several zones (10, 20, . . . ) of the furnace under the proviso that the furnace is provided with two or more heating cassettes (12, 12' . . . ), and the total number of zones (10, 20, . . . ) is greater than the number of said zones, by means of which the heating cassette (12), which covers the several zones, is connected to.

10. The multi-zone furnace according to claim 1, characterized in that the heating cassettes (12, 12' . . . ) are realized in a manner such that the individual zones are configured to be kept on a temperature level, which is in a range of from 50 ° C. to 500 ° C., preferably in a range of from 100 ° C. to 350 ° C.

11. A catalytic device comprising: the multi-zone furnace according to claim 1.

12. A method comprising:
checking catalysts using a catalytic device according to claim 11.

13. The method according to claim 12, wherein said method occurs a catalytic testing facility.

* * * * *

UNITED STATES PATENT AND TRADEMARK OFFICE
CERTIFICATE OF CORRECTION

PATENT NO.       : 8,490,475 B2
APPLICATION NO.  : 12/867344
DATED            : July 23, 2013
INVENTOR(S)      : Dejmek et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 360 days.

Signed and Sealed this
Eighth Day of September, 2015

Michelle K. Lee
*Director of the United States Patent and Trademark Office*